United States Patent
Perabo (10) Patent No.: US 9,528,578 B2
(45) Date of Patent: Dec. 27, 2016

(54) LIFT SYSTEM, OVERLOAD COUPLING AND METHOD FOR OPERATING THE LIFT SYSTEM

(71) Applicants: EFS-Gesellschaft fuer Hebe- und Handhabungstechnik mbH, Nordheim (DE); Klaus Perabo, Lorch (DE)

(72) Inventor: Klaus Perabo, Lorch (DE)

(73) Assignee: EFS-Gesellschaft fuer Hebe- und Handhabungstechnik mbH, Nordheim (DE)

( * ) Notice: Subject to any disclaimer, the term of this patent is extended or adjusted under 35 U.S.C. 154(b) by 253 days.

(21) Appl. No.: 14/477,106

(22) Filed: Sep. 4, 2014

(65) Prior Publication Data
US 2015/0059501 A1 Mar. 5, 2015

(30) Foreign Application Priority Data
Sep. 4, 2013 (EP) .................................. 13004334

(51) Int. Cl.
*F16H 27/02* (2006.01)
*F16H 29/02* (2006.01)
(Continued)

(52) U.S. Cl.
CPC ................. *F16H 19/02* (2013.01); *B66D 1/14* (2013.01); *F16D 7/044* (2013.01);
(Continued)

(58) Field of Classification Search
CPC ...... F16D 7/044; F16D 43/2024; F16H 35/10; F16H 19/02; B66D 1/14
See application file for complete search history.

(56) References Cited

U.S. PATENT DOCUMENTS

| 1,479,706 | A | * | 1/1924 | Fleischer | ................ F16D 7/044 192/24 |
| 3,603,436 | A | | 9/1971 | Bartholomew | |

(Continued)

FOREIGN PATENT DOCUMENTS

| DE | 1 140 033 B | 11/1962 |
| DE | 40 07 483 A1 | 9/1990 |

(Continued)

*Primary Examiner* — David M Fenstermacher
*Assistant Examiner* — Jake Cook
(74) *Attorney, Agent, or Firm* — Walter Ottesen, P.A.

(57) ABSTRACT

A lift system defines a vertical hoist axis and includes a holding unit for lifting and lowering an object in a direction along the vertical hoist axis. An overload coupling mutually connects the drive shaft of a motor and the input shaft of a gear assembly. The overload coupling includes a latch mechanism having a motor latch part and a gear assembly latch part. The latch mechanism defines a latch characteristic providing a first transmittable torque in a lowering rotational direction and a second transmittable torque in a lifting rotational direction determined so as to cause the first transmittable torque to be less than the second transmittable torque. The latch mechanism includes a rotational positioning device configured to permit a latching of the motor latch part into the gear assembly latch part in only one possible relative rotational angle position within 360° referred to the lifting rotational direction.

15 Claims, 4 Drawing Sheets

(51) Int. Cl.
*F16H 19/02* (2006.01)
*F16H 35/10* (2006.01)
*B66D 1/14* (2006.01)
*F16D 7/04* (2006.01)
*F16D 43/202* (2006.01)

(52) U.S. Cl.
CPC ......... *F16D 43/2024* (2013.01); *F16H 35/10* (2013.01); *Y10T 74/188* (2015.01)

(56) References Cited

U.S. PATENT DOCUMENTS

| | | |
|---|---|---|
| 6,244,449 B1 | 6/2001 | Pech |
| 2005/0133330 A1 | 6/2005 | Stiefvater |

FOREIGN PATENT DOCUMENTS

| | | |
|---|---|---|
| DE | 100 05 411 A1 | 8/2001 |
| EP | 0 354 988 A1 | 2/1990 |
| WO | 2009/036595 A1 | 3/2009 |

* cited by examiner

LIFT SYSTEM, OVERLOAD COUPLING AND METHOD FOR OPERATING THE LIFT SYSTEM

CROSS REFERENCE TO RELATED APPLICATION

This application claims priority of European patent application no. 13004334.2, filed Sep. 4, 2013, the entire content of which is incorporated herein by reference.

BACKGROUND OF THE INVENTION

In handling technology, objects are moved from one location to another by means of a handling system in order to transfer them, for example, from a feed belt to a processing machine. Such handling systems have both a horizontal movement device and a vertically operating lift system with a holding unit for lifting and lowering an object in the direction of a vertical hoist axis. The lift system comprises a motor unit with a drive shaft, a rotational angle transducer for the drive shaft and a gear assembly with an input shaft, wherein the motor unit drives the input shaft of the gear assembly with its drive shaft.

The specific motor unit generally includes a servomotor whose rotational speed can be regulated in order to permit defined vertical load movements. The rotational angle transducer which is present at the motor or at the drive shaft thereof can detect rotational angles of 0° to 360° in sufficiently small increments. A very precisely defined vertical position of the holding unit and of the load held therein can be derived from the current rotational angle position in conjunction with the known transmission ratio of the gear assembly, which is necessary for precise positioning of the load.

For the determination of the elevation to be successful, at least two preconditions have to be met: as a first precondition vertical calibration has to be performed in advance. For this purpose, the holding unit or the load held therein is moved to a specific reference elevation value with the greatest possible accuracy and the reference elevation value is determined in a specific position by technical measurement means. At the same time, the associated current rotational angle of the motor drive shaft is detected. From this and from the transmission ratio of the entire gear assembly, more precisely from the stroke of the holding unit, which follows from a 360° rotation of the motor drive shaft, a precise determination of the elevation can be carried out later solely by means of the rotational angle interrogation in conjunction with an integral multiple of individual 360° rotations. As a second precondition it is to be ensured that a fixed assignment between the rotational position of the motor and rotational position of the gear assembly input shaft is maintained during the entire handling operation. If this fixed rotational angle assignment is lost, the complex calibration process described above has to be performed again, which is very work-intensive and time-consuming.

When the load is lifted, a torque is introduced which lifts the holding unit in the direction of the vertical hoist axis, via the gear assembly. The weight of the load and the lifting device itself brings about the lowering. This is counteracted by the motor with its torque in a braking fashion. If the load collides with an obstacle during the lowering, the load is abruptly braked as a result. The motor which has until now been braking in the generator mode then suddenly changes its mode of operation and runs as a motor with its motor mass at the maximum rotational speed into the blocked gear assembly. Direct consequences of this are frequent gear assembly damage which requires this component to be replaced. Such collisions occur frequently, in particular, in the case of putting into service, in the setting-up operation, in the case of fault messages or in the case of control faults.

In order to avoid such collision damage, it is known to use overload couplings with which the drive shaft of the motor unit and the input shaft of the gear assembly are connected and which slip above a limiting torque. However, a reasonable configuration of the limiting torque or slipping torque is difficult in the case of use on the vertical hoist axis since, on the one hand, when the load is lifted a high torque has to be transmitted, while, on the other hand, such a high torque is not necessary during lowering. Furthermore, for the case of collision during lowering it is desirable to have the smallest possible limiting torque or slipping torque. It is necessary to make a compromise which is not always satisfactory. However, in particular the slipping of the overload coupling causes the rotational angle assignment between the motor drive shaft and the gear assembly input shaft and therefore the elevation information which is necessary for precise positioning to be lost. After slipping, the complex elevation calibration described above has to be carried out again.

SUMMARY OF THE INVENTION

It is an object of the invention to provide a lift system of the kind described above configured in such a way that, in the event of a collision, the system can be put into service again quickly while avoiding damage.

It is also an object of the invention to provide an overload coupling for use in such a lift system. The overload coupling permits reliable lifting and lowering as well as a uniquely defined elevation assignment of the load.

It is still another object of the invention to provide a method for operating such a lift system with which, after unlatching of the overload coupling occurs in the event of a collision, a reference elevation value can be restored quickly and precisely and consequently the system can be quickly put into service again.

According to the invention, a lift system or an overload coupling for use in such a lift system is provided, wherein the overload coupling has a latch mechanism with a motor end latch part and a gear assembly end latch part. The latch mechanism has a latching characteristic which provides a first transmissible torque in a lowering rotational direction and a second transmissible torque in a lifting rotational direction in such a way that the first transmissible torque is lower than the second transmissible torque. The latch mechanism also has rotational positioning means which are configured in such a way that latching of the motor end latch part into the gear assembly end latch part is possible in only one relative rotational angle position within 360° with respect to the lifting rotational direction.

Owing to the asymmetrical latching characteristic with a comparatively high transmissible torque in the lifting rotational direction, even heavy loads or objects can be reliably lifted under the effect of a correspondingly high drive torque without the overload coupling becoming unlatched or slipping. During the lowering process, no such large transmissible torques are necessary. Owing to the comparatively low first transmissible torque, the overload coupling is triggered early in the event of a collision, with the result that collision damage is reliably avoided. The abovementioned rotational positioning means subsequently ensure that during the re-latching of the latch mechanism a uniquely defined relative rotational angle position is restored between the two latch parts and therefore between the motor end drive shaft and the gear assembly end input shaft. This considerably simplifies the restoration of the reference elevation value which has been lost during the unlatching process, in particular according to the following method according to the invention.

Firstly during customary operation, the holding unit or the object which is held thereby is moved within a work elevation range by means of the lift system. Beforehand, a reference elevation value is determined in a calibration process. The current elevation of the holding unit is determined during its handling from the previously obtained reference elevation value and the signals of the rotational angle transducer. If the latch mechanism of the overload coupling then unlatches during lowering of the holding unit or of the object held thereby, for example owing to an unintended collision, the defined relative rotational angle position between the two latch parts and therefore the reference elevation value necessary for the open-loop or closed-loop control of the position are first lost. In order to restore the reference elevation value, lifting of the holding unit is then initiated by means of the motor unit, as a result of which the unlatched latch mechanism latches again in just one possible and defined relative rotational angle position within 360° with respect to the lifting rotational direction. After the latching, the holding unit is then lifted, wherein even in this state the originally provided relative rotational angle position between the two latch parts is restored.

The holding unit is then lifted further into a reference elevation range, wherein the vertical extent of the reference elevation range ≤ such a stroke of the holding unit which follows from a 360° rotation of the drive shaft of the motor unit. Within this reference elevation range, the current rotational angle position of the drive shaft is then obtained by means of the rotational angle transducer, and the reference elevation value of the holding unit or of the object held thereby is restored on the basis thereof.

In contrast to the prior art, it is therefore not necessary to aim for a precise vertical value or determine the value by measuring technology. Furthermore, the signal of the rotational angle transducer no longer has to be assigned again to such a reference elevation value. Rather, rough positioning within a wide reference elevation range instead of a precise reference elevation value is sufficient. The precise determination of the elevation can be carried out within the reference elevation range solely on the basis of the rotational angle transducer since, of course, owing to the overload coupling which is configured according to the invention a rotational angle assignment of the motor end drive shaft and gear assembly end input shaft which is uniquely defined within 360° is ensured. Taking this as a basis, the customary working mode can be resumed directly and without a large amount of expenditure on calibration, by adjusting the holding unit again to the working elevation range and moving it there. The current elevation can be determined again at any time from the restored reference elevation value and the signals of the rotational angle transducer. The rotational angle transducer specifies a precise position within 0° to 360°. The abovementioned stroke follows from a full 360° rotation. The precise current elevation, which can be obtained solely by roughly approaching the reference elevation range while avoiding complex calibration methods, now results from the sum of all 360° rotations and the current rotational angle position within a 360° circle. A uniquely defined elevation assignment of the load is easily restored, with the result that the system can be quickly put into service again while avoiding damage.

It may be practical to configure the asymmetrical latching characteristic described above in such a way that unlatching is possible with increased torque even in the lifting rotational direction. However, the latching characteristic is preferably configured in such a way that overload-induced unlatching is permitted only in the lowering rotational direction. This is the most relevant case in practice. Furthermore, dispensing with unlatching in the lifting rotational direction permits even relatively heavy loads to be lifted reliably.

Any desired designs which generate the previously specified latching characteristic are possible for the configuration of the overload coupling. The overload coupling is preferably a claw coupling with end-side claws on the motor end latch part and/or on the gear assembly end latch part, wherein the motor end latch part is pressed against the gear assembly end latch part in a torque-transmitting working position under spring prestress in an axial direction, and wherein the motor end latch part can be moved relatively out of its working position in the axial direction with respect to the gear assembly end latch part into an unlatching position. This provides a compact design which, on the one hand, can transmit large torques but, on the other hand, also permits sensitive setting of the maximum transmissible torque. In the unlatched state, the wear is low when the drive firstly runs on again.

The claws are preferably embodied asymmetrically with slide flanks acting in the lowering rotational direction and lift flanks which are steeper compared to the slide flanks and act in the lifting rotational direction. An optional possibility is to provide the lift flanks with such an inclination that as a result in each case an undercut is formed. Once the engaged state is entered, a self-amplifying wedging effect occurs owing to the undercut with the result that even in the case of very high torques inadvertent unlatching cannot occur in the lifting rotational direction.

Various suitable possibilities, which can comprise, for example, an unequal distance between the individual claws, are possible for the configuration of the rotational positioning means. The rotational positioning means are preferably formed by an axial projection and a single projection receptacle which corresponds to the projection. This ensures that in fact only the single relative rotational angle position can be assumed within 360°, while unintended intermediate positions are excluded.

According to another feature of the invention, the projection merges flush with an annular-shaped slide surface, wherein the annular-shaped slide surface is interrupted by the projection receptacle. This ensures that when the overload coupling unlatches, the projection lying opposite slides off over the slide surface with the claws without contact until it can latch into the projection receptacle again. By virtue of the fact that the projection is held at a distance from the claws lying opposite, rattling does not occur but instead there is a uniform sliding movement which minimizes wear.

In one preferred embodiment, the motor end latch part and/or the gear assembly end latch part are held in a longitudinally displaceable and rotationally fixed fashion, in particular with a spline, on an assigned adapter piece, wherein means are provided which permit the motor end latch part and/or the gear assembly end latch part to be mounted on the assigned adapter piece in just one relative rotational angle position. Such means can comprise, for example, a void in the spline. A simple 360° positional securing means is formed which has the advantage that the prestress of the compression spring can still be changed later or general maintenance and mounting/removal operations can be performed, wherein renewed setting-up or renewed elevation calibration is unnecessary because the rotational angle position is unchanged.

In one preferred embodiment, the overload coupling comprises a sensor arrangement for detecting the latched or unlatched state of the latch mechanism. The lift system advantageously has a control unit which is configured to carry out the method according to the invention described above. In the event of a collision or of unlatching, it is possible, without a large degree of manual control complexity, to carry out an automatic procedure by means of which the reference elevation value described above is restored.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
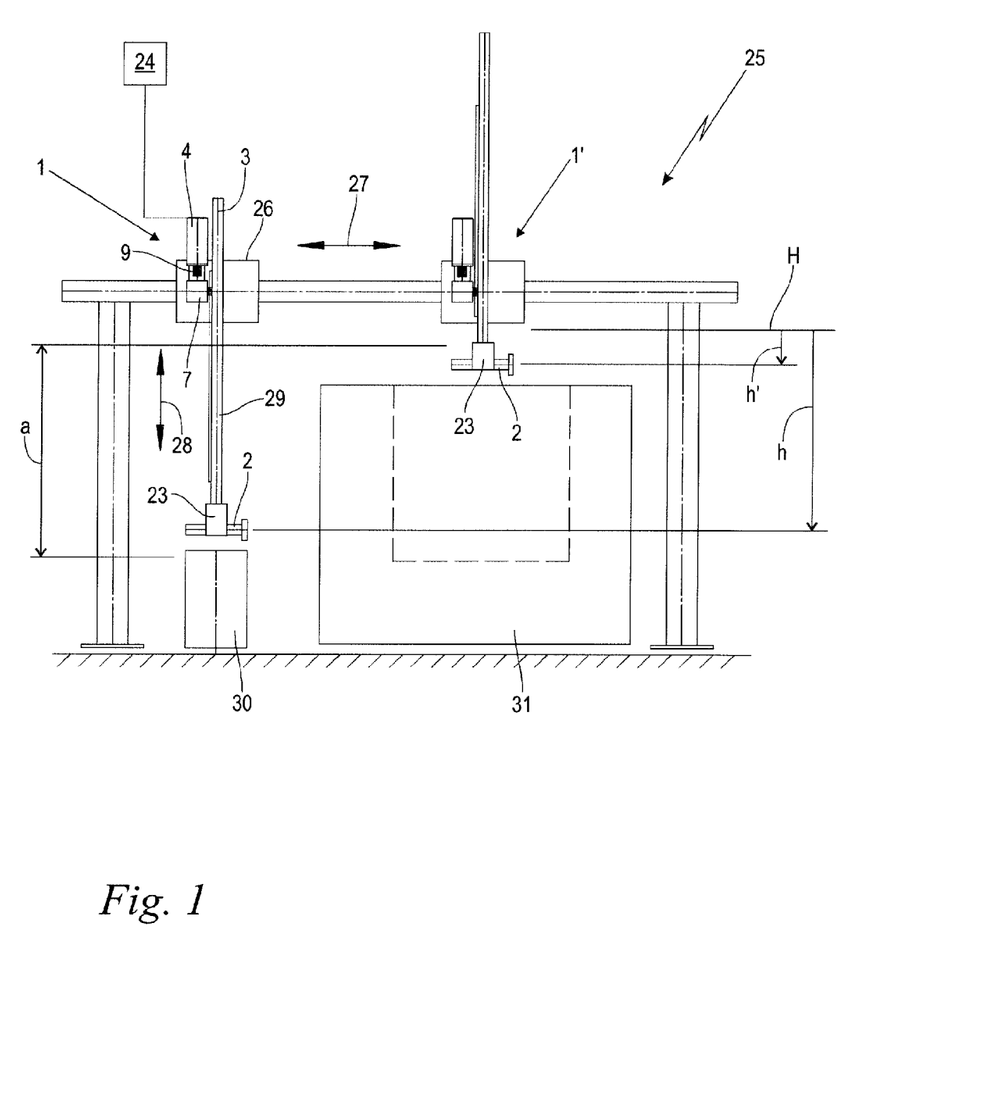
FIG. 1 is a schematic side view of a handling arrangement for objects having a lift system which is embodied according to the invention and has an overload coupling according to the invention in various working positions.

FIG. 1 shows a handling system 25 for objects 2 in a schematic side view. The handling system 25 is equipped here, for example, in a two-axial fashion with a horizontal adjustment device 26 for moving the object 2 in a horizontal direction according to a double arrow 27, and with a vertical lift system 1 for lifting and lowering the object 2 in the direction of a vertical hoist axis 3 according to a double arrow 28. Any desired number of movement axes can be provided as long as at least the vertical lift system 1 is present.

The handling system 25 which is shown by way of example is constructed in the form of a gantry which spans a feed belt 30 and a processing machine 31 for the objects 2. The lift system 1 is provided with a holding unit 23 for picking up and holding an object 2.

The object 2, which is transported by the feed belt 30, is grasped by the holding unit 23, lifted up in the vertical direction by the lift system 1 counter to the acting gravity, moved to the processing machine 31 and is lowered there in the direction of the action of gravity for further processing. In its horizontal position in which it is moved toward the processing machine 31, the lift system is provided with the reference symbol 1'. Instead of the process shown here by way of example, any desired movement process of the lift system 1 can be carried out with lifting and lowering of any desired object 2 within the scope of the handling technology according to the invention.

The lift system 1 according to the invention comprises a motor unit 4, a gear assembly 7 and an intermediately connected overload coupling 9. Driving lifting movement of the motor unit 4 is transmitted via the gear assembly 7 to a hoist rod 29 at whose lower end the holding unit 23 is attached. Depending on the rotational direction of the motor unit 4, the hoist rod 29 is lifted or lowered together with the holding unit 23 in accordance with the double arrow 28 in the direction of the vertical hoist axis 3. During lifting counter to gravity, a drive power is made available by the motor unit 4. The lowering in the opposite direction occurs owing to the gravity acting on the hoist rod 29, the holding unit 23 and the object 2, wherein the motor unit 4 acts in a braking fashion without drive power in the generator mode. However, an active drive with motor power can also be provided during lowering.

Figure 2:
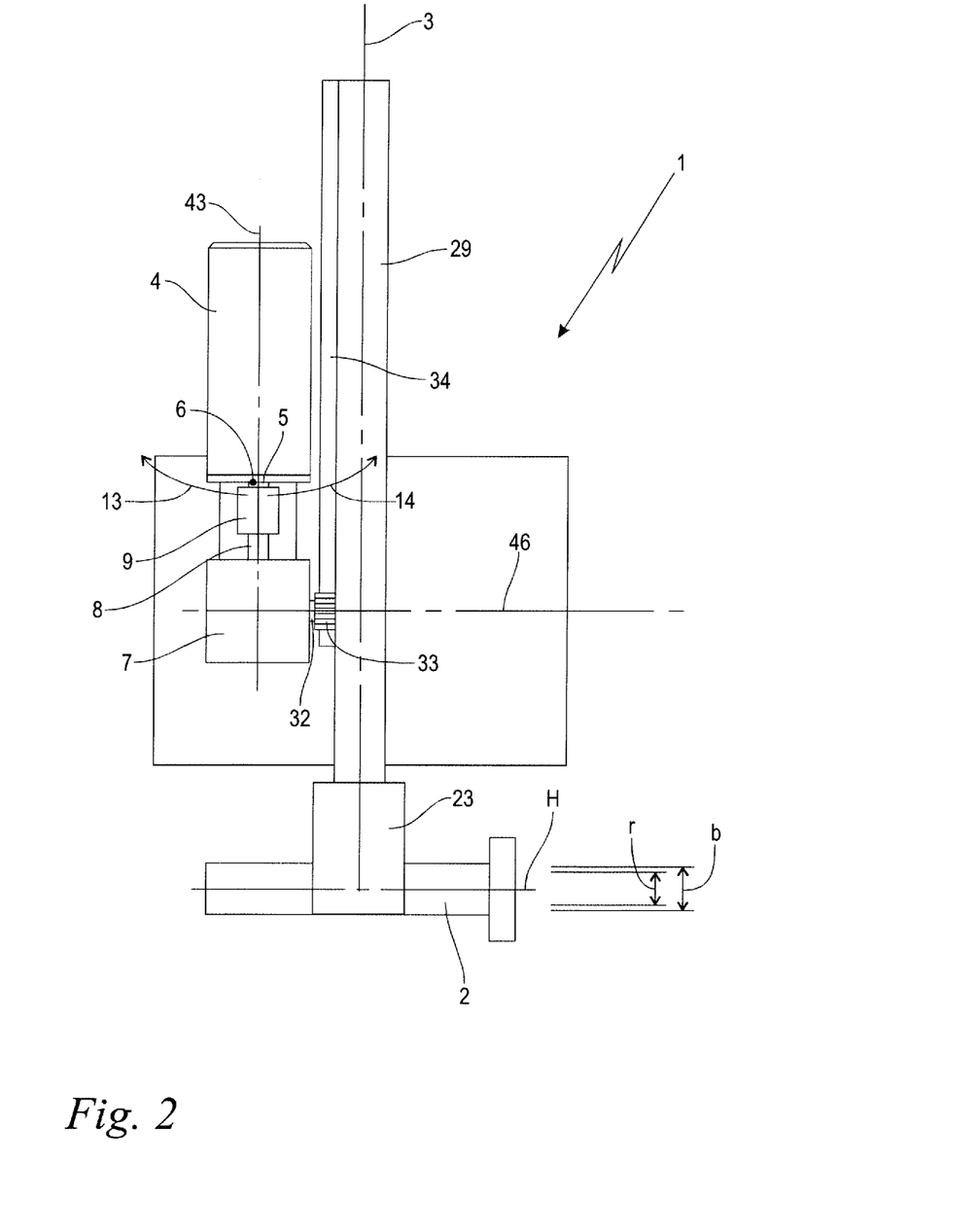
FIG. 2 is an enlarged view of a detail of the lift system according to FIG. 1 during the restoration of a reference elevation value.

FIG. 2 shows an enlarged view of a detail of the lift system 1 according to FIG. 1 with further details of its components, wherein identical features are provided with identical reference numerals. The motor unit 4 has a drive shaft 5 and a schematically indicated rotational angle transducer 6 for the drive shaft 5. On its end facing the motor unit 4, the gear assembly 7 has an input shaft 8. The drive shaft 5 of the motor unit 4 and the input shaft 8 of the gear assembly 7 are connected in a torque-transmitting fashion by the overload coupling 9. The drive shaft 5 and the input shaft 8 have a common rotational axis 43 which is vertical and parallel with respect to the hoist axis 3. An output shaft 32 of the gear assembly 7 is at a right angle thereto with a horizontal rotational axis 46. A pinion 33, which engages in a toothed rack 34 which is permanently connected to the hoist rod 29, is driven by the output shaft 32. The drive shaft 5 of the motor unit 4 can optionally be rotated in a lowering rotational direction 13 or in a lifting rotational direction 14. This rotational movement is transmitted via the angular gear assembly 7, the pinion 33 and the toothed rack 34 in an upward movement or downward movement, depending on the rotational direction, of the structural unit composed of the hoist rod 29 and the holding unit 23. Instead of the toothed rack drive shown, a spindle drive or the like can also be provided.

Figure 3:
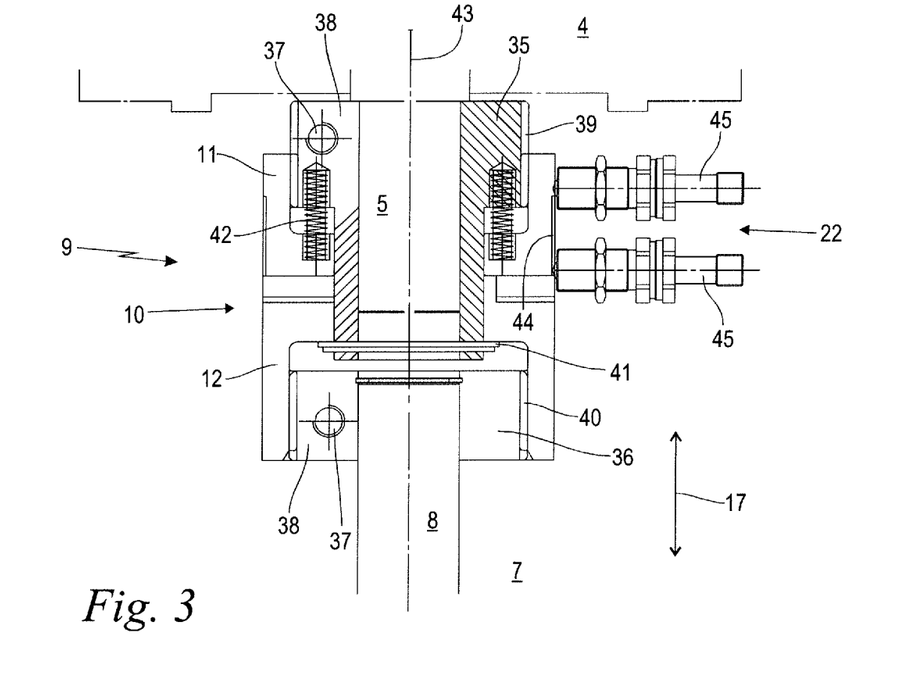
FIG. 3 shows a partially sectional schematic of the overload coupling of the lift system according to FIGS. 1 and 2 with details on the structural design.

FIG. 3 shows the overload coupling 9 according to FIG. 2 in a partially sectional schematic. Accordingly, the overload coupling 9 has a latch mechanism 10 with a motor end latch part 11 and a gear assembly end latch part 12. A first adapter piece 35 is fitted onto the drive shaft 5 of the motor unit 4, while a second adapter piece 36 is fitted onto the input shaft 8 of the gear assembly 7. For this purpose, the two adapter pieces (35, 36) each have a slit 38 with a clamping screw 37, as a result of which a clamping and rotationally fixed connection is produced between the first adapter piece 35 and the drive shaft 5 and the second adapter piece 36 and the input shaft 8. However, alternatively or in combination therewith, it is also possible to provide a feather key, a spline or the like.

The motor end latch part 11 is pushed onto the first adapter piece 35, which is fixedly connected to the drive shaft 5, in such a way that although the latch part 11 can be moved in an axial direction 17 relative to the first adapter piece 35, at the same time a torque-transmitting connection is produced between the adapter piece 35 and the first latch part 11 by means of a spline 39. The second latch part 12 is also pushed onto the first adapter piece 35 of the drive shaft 5 and mounted there so as to be rotatable relative to the first adapter piece 35. The second latch part 12 is secured axially by means of a ring 41. Prestressing means are provided between the first adapter piece 35 and the first, motor end latch part 11, the prestressing means being embodied in the exemplary embodiment shown as compression springs 42, more precisely as helical compression springs. However, other designs of compression springs 42 or prestressing means can also be appropriate. The compression springs 42 press the first latch part 11 downward in the axial direction 17 against the second latch part 12, which is supported by means of the ring 41 in order to hold it against the acting compressive force. The above-mentioned compressive prestress and latching means which are described in more detail below produce a torque-transmitting connection between the two latch parts (11, 12).

The input shaft 8 of the gear assembly 7 engages in the second latch part 12 by means of a spline 40, with the result that a torque-transmitting connection is produced between the second latch part 12 and the input shaft 8 of the gear assembly 7. The spline 40 can compensate small positional tolerances and angle tolerances here. In the customary working mode, the above-mentioned arrangement constitutes a means of transmitting torque between the drive shaft 5 of the motor unit 4 and the input shaft 8 of the gear assembly 7.

The splines (39, 40) each have a void (not illustrated in more detail) in which a wedge or a tooth gap between them is missing. As a result, means are provided which permit mounting of the motor end latch part 11 and of the gear assembly end latch part 12 on the respectively assigned adapter piece (35, 36) in just one relative rotational angle position. The same also applies to the feather key, spline coupling or the like, already mentioned above as an option, between the first adapter piece 35 and the drive shaft 5 or between the second adapter piece 36 and the input shaft 8. Other, in particular, positively locking means such as non-round cross sections or the like, by means of which mounting is possible in just one relative rotational position, are also possible.

Figure 4:
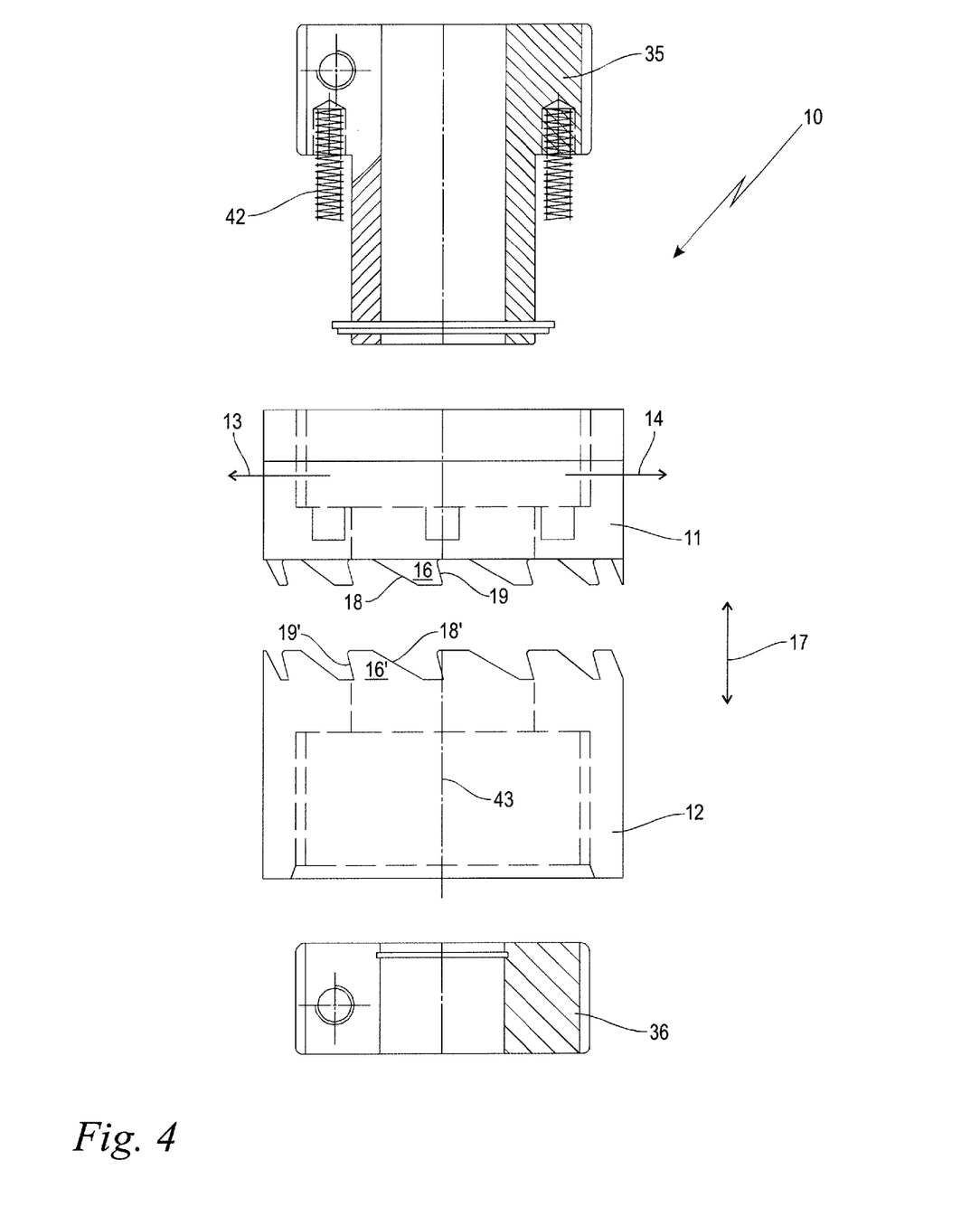
FIG. 4 is an exploded schematic of the individual parts of the latch mechanism of the overload coupling according to FIG. 3 with details relating to the configuration of the claws; and, FIG. 5 shows a plan view of a latch part of the latch mechanism according to FIG. 4 with details relating to the spatial arrangement of the claws in conjunction with a projection and a projection receptacle for ensuring a defined rotational angle position.

FIG. 4 shows the individual parts of the latch mechanism 10 according to FIG. 3 in an exploded view. The two adapter pieces (35, 36), which are preferably manufactured as aluminum extruder press components, have central drilled bores for receiving the drive shaft 5 and input shaft 8, respectively, assigned thereto. In particular it is apparent that the overload coupling 9 (FIG. 3) is, as a result of the configuration of the latch mechanism 10 which is illustrated here in detail, a claw coupling with end-side claws 16 on the motor end latch part 11 and/or on the gear assembly end latch part 12. The two latch parts (11, 12) are expediently manufactured as plastic injection molded components. It may be practical to arrange such claws 16 on just one of the two latch parts (11, 12), while corresponding receptacles are provided on the other latch part (12, 11) lying opposite. In the exemplary embodiment shown, the two latch parts (11, 12) each have, on their end side facing the other latch part (12, 11), a number of claws (16, 16') which extend in the axial direction. In the operating state according to FIG. 3, in which the motor end latch part 11 is pressed, in a torque-transmitting working position under spring prestress, against the gear assembly end latch part 12 in the axial direction 17, the claws (16, 16') engage one in the other and bring about a torque-transmitting connection.

In the preferred embodiment shown, the claws (16, 16') are embodied with slide flanks (18, 18') which act in the lowering rotational direction 13, and lift flanks 19 which act in the opposite lifting rotational direction 14. The lift flanks (19, 19') are at a pitch angle which is steeper or larger in absolute size than the slide flanks (18, 18') with respect to the circumferential direction here. In the preferred embodiment shown, the lift flanks 19 are even inclined counter to the lowering rotational direction 13 starting from the base body of the first latch part 11, as a result of which an undercut is formed. The same also applies analogously to the lift flanks 19' of the claws 16' of the second latch part 12, which are inclined counter to the lifting rotational direction 14 and therefore also form an undercut. If the claws (16, 16') are latched one in the other, and a lifting, torque-transmitting drive occurs in the lifting rotational direction 14, the specified undercut brings about, by assisting the prestressing force of the compression springs 42, an automatic or self-locking wedging effect of the claws (16, 16'). Slipping or ratcheting of the first latch part 11 with respect to the second latch part 12 is not possible. Instead, any desired torques can be transmitted in the lifting rotational direction 14 within the scope of the permissible limits.

In the opposite lowering rotational direction 13, the slide flanks (18, 18'), which rest one on the other, also bring about a transmission of torque owing to the contact pressing force by the compression springs 42, but the maximum transmissible torque is limited. Since the slide flanks 18 of the first, motor end latch part 11 are inclined counter to the lowering rotational direction 13, starting from the base body, while the corresponding slide flanks 18' of the second, gear assembly end latch part 12 are inclined in the opposite direction, the slide flanks (18, 18') which rest one on the other in pairs tend to bring about mutual sliding off. Owing to the oblique positioning of the slide flanks 18, such sliding off brings about an axial relative movement between the two latch parts (11, 12) counter to the prestressing force which is applied by the compression springs 42. Therefore, before such sliding off occurs, the prestressing force of the compression springs 42 must firstly be overcome. The prestressing force of the compression springs 42 therefore defines the maximum torque which can be transmitted in the lowering rotational direction 13 by means of the inclination angle of the slide flanks (18, 18') and the sliding friction coefficient present between them. If, for example, the object 2 or the holding unit 23 collides with unexpected obstacles during operation in accordance with the illustration according to FIG. 1, the specified torque which can be transmitted in the lowering rotational direction 13 can be exceeded. The oblique positioning of the slide flanks (18, 18') causes the prestressing force which is caused by the compression springs 42 to be overcome. The motor end latch part 11 is lifted counter to the prestressing force of the compression springs 42 to such an extent that the claws (16, 16') no longer engage one in the other. The transmission of torque is interrupted immediately even if the motor unit 4 (FIGS. 1 to 3) still continues to run for several rotations. However, if the motor unit 4 is switched over and is driven in the lifting rotational direction 14, the motor end latch part 11 latches automatically into the gear assembly end latch part 12 again owing to its spring prestress, as a result of which the torque-transmitting connection is restored.

Overall, as a result of the arrangement described above a latch mechanism 10 is described whose latching characteristic is asymmetrical with respect to the lowering rotational direction 13 or the lifting rotational direction 14. A first torque which can be transmitted in the lowering rotational direction 13 is smaller than the second torque which can be transmitted in the lifting rotational direction 14. It is also apparent that the latching characteristic of the latch mechanism 10 permits overload-induced unlatching of the motor end latch part 11 from the gear assembly end latch part 12 only in the lowering rotational direction 13 but not in the lifting rotational direction 14. The relative movement of the two latch parts (11, 12) which is described above is to be understood as relative movements with any desired reference points. Although the gear assembly end latch part 12 in the exemplary embodiment shown is fixed in the axial direction 17 while the motor end latch part 11 can be moved in the axial direction, inverted fixing and displaceability can be provided with the same effect.

The arrangement shown is configured for specific working rotational directions, wherein the arrow of the lowering rotational direction 13 is shown here pointing to the left in the drawing and the arrow of the lifting rotational direction 14 pointing to the right in the drawing. Depending on the application, the lowering rotational direction 13 and the lifting rotational direction 14 can, however, also extend in opposite directions. In this case, the claws (16, 16') would have to be configured in a correspondingly mirror-inverted fashion.

Figure 5:
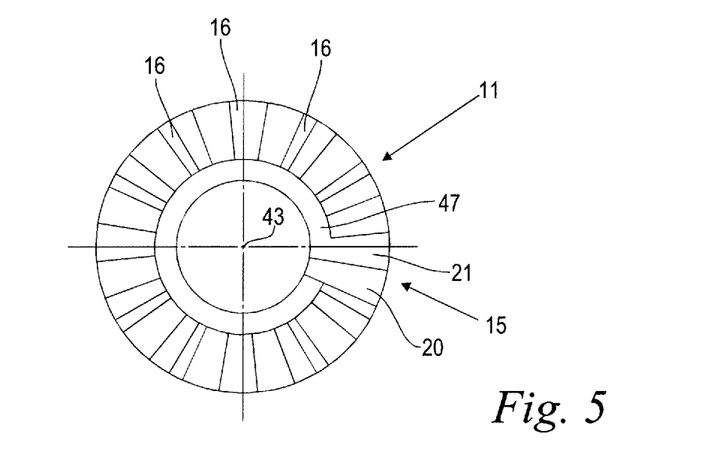

FIG. 5 shows a plan view of the latch part 11 according to FIG. 4; accordingly, a plurality of claws 16 are arranged distributed uniformly about the rotational axis 43. This uniform distribution is interrupted only at a single point, and accordingly instead of a claw 16 an axially protruding projection 20 is formed, and next to it in the circumferential direction an axially set-back projection receptacle 21 is formed in the latch part 11. The shape of the projection receptacle 21 corresponds precisely to the shape of the projection 20. The latch part 12 (not illustrated here) is of identical configuration with respect to the claws 16' (FIG. 4) and also identically has such a projection 20 and such a projection receptacle 21. With respect to the end-side configuration, the two latch parts (11, 12) are accordingly identical parts. The projections 20 and the projection receptacles 21 together form rotational positioning means 15 which permit the motor end latch part 11 to latch into the gear assembly end latch part 12 in just one relative rotational angle position within 360° with respect to the lifting rotational direction 14. In all the deviating rotational angle positions, the projections 20 collide with the claws (16, 16') lying opposite, with the result that latching in is not possible.

The latch part 11 shown here also has an annular-shaped slide surface 47 radially on the inside of the claws 16, in which slide surface 47 the projection 20 merges in a flush fashion. This means, in other words, that the upper free surface of the projection 20 is at the same and constant elevation level with respect to the direction of the rotational axis 43 as the planar slide surface 47. Both are elevated with respect to the upper, free surfaces of the claws 16. The annular-shaped slide surface 47 runs virtually completely around the rotational axis 43 and is interrupted at merely one point, specifically by the projection receptacle 21. The latch part 12 lying opposite (FIG. 4) does not have such a slide surface 47. The projection 20, not shown here but extending radially inwards as far as the slide surface 47, of the latch part 12 lying opposite slides off on the slide surface 47 when the overload coupling 9 unlatches, without colliding with the claws 16, until it can latch into the assigned projection receptacle 21.

The illustration according to FIG. 3 also shows that the overload coupling 9 has a sensor arrangement 22. Associated with the sensor arrangement 22 are two sensors 45 which lie one on top of the other in the axial direction 17 and a metal band 44 which is wound around the upper, motor end latch part 11. The two sensors 45 are positioned in the axial direction 17 in such a way that the lower sensor 45 detects the metal band 44 when the upper, axially displaceable latch part 11 is lowered downward and latched in, while the upper sensor 45 detects the metal band 44 by sensor when the upper, motor end latch part 11 is lifted up and is unlatched from the lower, gear assembly end latch part 12. The latched state and unlatched state of the latch mechanism 10 can therefore be detected by means of the sensor arrangement 22.

From the combination of FIG. 1 with FIG. 3 it is apparent that a control unit 24 is provided for operating the handling system 25 and, in particular, for operating the lift system 1. The acquired data of the rotational angle transducer 6 and of the sensor arrangement 22 are fed to the control unit 24. The latter is configured in its configuration and programming in such a way that the motor unit 4 and therefore the lift system 1 are actuated together to carry out the method described below while taking into account the data of the rotational angle transducer 6 and of the sensor arrangement 22.

Firstly, an elevation calibration of the system is performed in an initiating fashion in that a reference elevation value H (FIGS. 1 and 2) of the holding unit 23 or of the object 2 is determined and made available to the control unit 24. Furthermore, information about the fixed transmission ratio of the gear assembly 7 is present in the control unit 24 in such a way that such a stroke (b), entered in FIG. 2, of the holding unit 23, which follows from a 360° rotation of the motor end drive shaft 5, is known. At the reference elevation value H, the rotational angle transducer 6 specifies a specific rotational angle position of the drive shaft 5. Starting from here, according to the illustration in FIG. 1 any desired relative elevations of the holding unit 23 or of the object 2, entered here, for example, as (h, h'), can be approached here within a work elevation range (a). The unit composed of the rotational angle transducer 6 and the control unit 24 acquires here an integral multiple of 360° rotations of the drive shaft 5 and also forms a difference between the rotational angle value at the reference elevation value H and the rotational angle value at the current elevation (h, h'). At the same time the current elevation (h, h') of the holding unit 23 or of the object 2 can be obtained in the control unit 24 from the latter and from the stroke (b). However, this presumes that a unique rotational angle assignment is maintained uninterruptedly between the drive shaft 5 and the input shaft 8, that is, the overload coupling 9 does not unlatch.

If an unexpected collision of the holding unit 23 or of the object 2 with an unexpected obstacle should now occur and the overload coupling 9 become unlatched, this rotational angle assignment and therefore the reference elevation value H are lost. The reference elevation value H has to be restored. For this purpose the motor unit 4 is switched in the lifting rotational direction 14 by means of the control unit 24, which has detected the unlatching of the overload coupling 9 via the sensor arrangement 22, and as a result the lifting up of the holding unit 23 is initiated. First, the overload coupling 9 consequently latches in again in the manner described above. Subsequently, the holding unit 23 is lifted with or without the object 2 held therein, into a reference elevation range r which is illustrated in FIG. 2. The reference elevation range r has a vertical extent which is ≤ the stroke (b) described above. Since the latch mechanism 10 described above is latched in again in just one possible and precisely defined relative rotational angle position within 360° with respect to the lifting rotational direction 14, rough positioning within the reference elevation range (r) is sufficient. The current elevation can be determined precisely, and the reference elevation value H restored, on the basis of the restored fixed rotational angle assignment in the overload coupling 9 and the then current rotational angle value of the rotational angle transducer 6, without knowledge of the sliding rotations previously taking place. The approaching or the acquisition of a precise reference elevation value by means of measuring technology and a new assignment of measurement values of the rotational angle transducer 6 are not necessary. Instead, the reference elevation value H can be restored quickly by means of the control unit 24 in an automated fashion without manual intervention, wherein the lift system 1 which is shown is ready for use again immediately afterwards, or when the unforeseen obstacle, which led to the collision, has been eliminated.

The overload coupling 9 according to the invention was described above in relation to a vertical lift system 1 with a vertical hoist axis 3 (FIG. 1). Within the scope of the invention, the overload coupling 9 can, however, also be used in handling systems with a horizontal or inclined movement axis. An asymmetrical latching characteristic for the opposing rotational directions (13, 14) is described here for the vertical hoist axis 3 in question. However, in particular in the case of a horizontal movement axis it is also possible, within the scope of the invention, for a symmetrical latching characteristic to be appropriate, for example as a result of symmetrically configured claws 16 (FIG. 4).

It is understood that the foregoing description is that of the preferred embodiments of the invention and that various changes and modifications may be made thereto without departing from the spirit and scope of the invention as defined in the appended claims.

What is claimed is:

1. A lift system defining a vertical hoist axis and comprising:
    a holding unit for lifting and lowering an object in a direction along said vertical hoist axis;
    a motor having a drive shaft;
    a gear assembly having an input shaft;
    an overload coupling mutually connecting said drive shaft of said motor and said input shaft of said gear assembly;
    said overload coupling including a latch mechanism having a motor end latch part and a gear assembly end latch part;
    said latch mechanism defining a latch characteristic providing a first transmittable torque in a lowering rotational direction and a second transmittable torque in a lifting rotational direction determined so as to cause said first transmittable torque to be less than said second transmittable torque; and,
    said latch mechanism including a rotational positioning device configured so as to permit a latching of said motor end latch part into said gear assembly end latch part in only one possible relative rotational angle position within 360° referred to said lifting rotational direction.

2. The lift system of claim 1, further comprising a rotational angle transducer associated with said drive shaft of said motor.

3. The lift system of claim 2, wherein said latch characteristic is configured to permit an overload-caused unlatching of said motor end latch part out of said gear assembly end latch part only in said lowering rotational direction.

4. The lift system of claim 3, wherein said overload coupling defines a coupling axis and is a claw coupling having end face claws on at least one of said motor end latch part and said gear assembly end latch part; resilient biasing means for resiliently biasing said motor end latch part into a torque-transmitting work position against said gear assembly end latch part in a direction along said axis of said overload coupling; and, said motor end latch part is displaceable out of said work position in the direction of said coupling axis into an unlatched position.

5. The lift system of claim 4, wherein said claws are configured to be unsymmetrical with slide flanks acting in said lowering rotational direction and, in said lifting rotational direction, said claws are further configured to have lift flanks which are steeper compared to said slide flanks.

6. The lift system of claim 5, wherein each of said lift flanks defines an undercut.

7. The lift system of claim 4, wherein said rotational position device is configured of an axial projection and only a single projection receptacle corresponding to said axial projection.

8. The lift system of claim 7, wherein said projection passes into a surface flush in an annularly-shaped slide surface interrupted by said projection receptacle.

9. The lift system of claim 4, wherein said overload coupling further comprises first and second adapter pieces assigned to corresponding ones of said motor end latch part and said gear assembly end latch part; and, said motor end latch part is held in said first adapter piece so as to be displaceable therein along said coupling axis and so as to prevent relative rotation therebetween; said gear assembly end latch part is held in said second adapter so as to be displaceable therein along said coupling axis and so as to prevent relative rotation therebetween.

10. The lift system of claim 9, further comprising a first spline for interconnecting said motor end latch part and said first adapter piece so as to prevent relative rotation therebetween and a second spine for interconnecting said gear assembly end latch part and said second adapter piece so as to prevent relative rotation therebetween.

11. The lift system of claim 10, further comprising means for permitting an assembly of said motor end latch part and/or said gear assembly end latch part on the adapter piece corresponding thereto in only one relative rotational angular position.

12. The lift system of claim 2, wherein said overload coupling includes a sensor arrangement for detecting a latched and an unlatched status of said latch mechanism.

13. The lift system of claim 2, further comprising a control unit configured to perform the following method steps:
    moving said holding unit within a work elevation range with said lift system wherein the current elevation (h) of said holding unit is determined from a previously determined reference elevation value (H) and the signals of said rotational angle transducer;
    when said latch mechanism disengages during lowering of said holding unit, initiating a lifting of said holding unit with said motor unit as a consequence of which the disengaged latch mechanism again engages within 360° in only one possible and defined relative rotational angle position referred to the lift rotational direction and said holding unit is again lifted;
    lifting said holding unit farther into a reference elevation range (r) with the elevation distance of said reference elevation range (r) being equal to or less than such a stroke (b) of said holding unit which results from a 360° rotation of said drive shaft of said motor unit;
    detecting the current rotational angle position of said drive shaft with said rotational angle transducer within said reference elevation range and reestablishing therefrom said reference elevation value (H) of said holding unit; and, starting from said reference elevation value (H), again moving said holding unit within a work elevation range (a) and, at the same time, determining again the current elevation (h) from the reestablished reference elevation value (H) and the signals of said rotational angle transducer.

14. An overload clutch for a lift system which defines a vertical hoist axis and includes a holding unit for lifting and lowering an object in a direction along said vertical hoist axis; a motor having a drive shaft; a gear assembly having an input shaft; the overload coupling mutually connecting said drive shaft of said motor and said input shaft of said gear assembly; the overload coupling comprising:
- a latch mechanism having a motor end latch part and a gear assembly end latch part;
- said latch mechanism defining a latch characteristic providing a first transmittable torque in a lowering rotational direction and a second transmittable torque in a lifting rotational direction determined so as to cause said first transmittable torque to be less than said second transmittable torque; and,
- said latch mechanism including a rotational positioning device configured so as to permit a latching of said motor end latch part into said gear assembly end latch part in only one possible relative rotational angle position within 360° referred to said lifting rotational direction.

15. A method of operating a lift system defining a vertical hoist axis and including:
- a holding unit for lifting and lowering an object in a direction along said vertical hoist axis;
- a motor having a drive shaft;
- a gear assembly having an input shaft;
- an overload coupling mutually connecting said drive shaft of said motor and said input shaft of said gear assembly;
- said overload coupling including a latch mechanism having a motor end latch part and a gear assembly end latch part;
- said latch mechanism defining a latch characteristic providing a first transmittable torque in a lowering rotational direction and a second transmittable torque in a lifting rotational direction determined so as to cause said first transmittable torque to be less than said second transmittable torque;
- said latch mechanism including a rotational positioning device configured so as to permit a latching of said motor end latch part into said gear assembly end latch part in only one possible relative rotational angle position within 360° referred to said lifting rotational direction; and,
- a rotational angle transducer associated with said drive shaft of said motor and configured to emit signals;

the method comprising the steps of:
moving said holding unit within a work elevation range (a) with said lift system wherein the current elevation (h) of said holding unit is determined from a previously determined reference elevation value (H) and the signals of said rotational angle transducer;

when said latch mechanism disengages during lowering of said holding unit, initiating a lifting of said holding unit with said motor unit as a consequence of which the disengaged latch mechanism again engages within 360° in only one possible and defined relative rotational angle position referred to the lift rotational direction and said holding unit is again lifted;

lifting said holding unit farther into a reference elevation range (r) with the elevation distance of said reference elevation range (r) being equal to or less than such a stroke (b) of said holding unit which results from a 360° rotation of said drive shaft of said motor unit;

detecting the current rotational angle position of said drive shaft with said rotational angle transducer within said reference elevation range and reestablishing therefrom said reference elevation value (H) of said holding unit; and, starting from said reference elevation value (H), again moving said holding unit within a work elevation range (a) and, at the same time, determining again the current elevation (h) from the reestablished reference elevation value (H) and the signals of said rotational angle transducer.

* * * * *